March 14, 1967  W. S. SAUNDERS  3,309,131
MEANS FOR REDUCING LINEAR WIND RESISTANCE IN SINGLE
CHASSIS TYPE VEHICLES
Filed Feb. 11, 1966
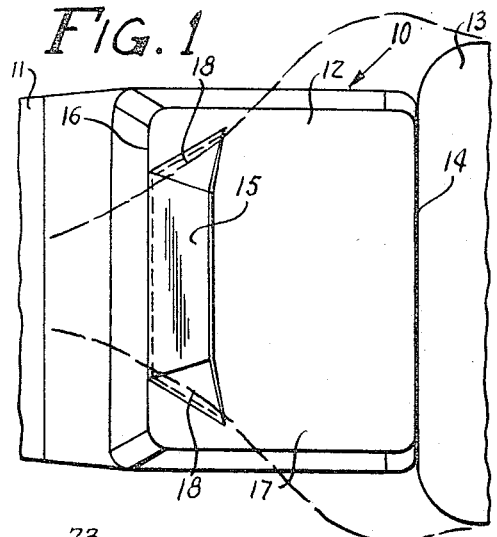
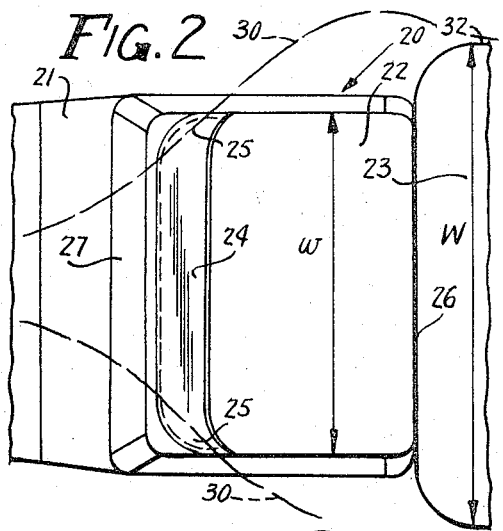
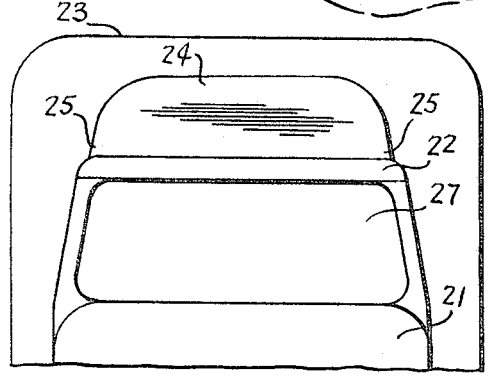
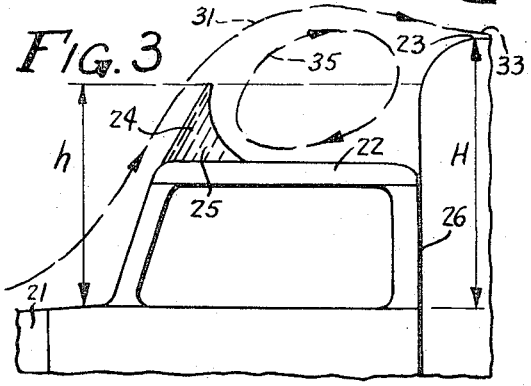
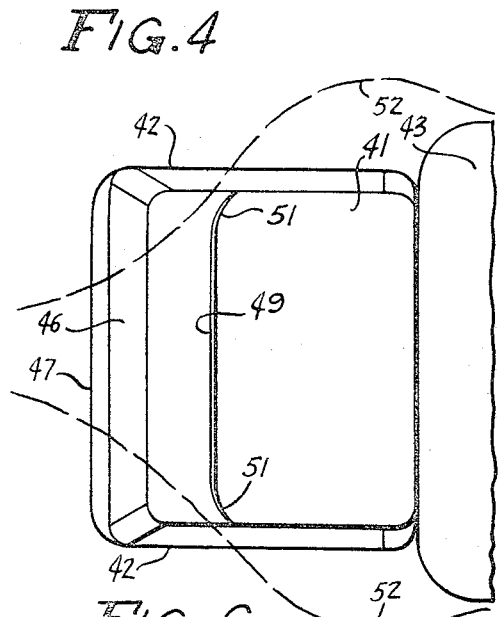
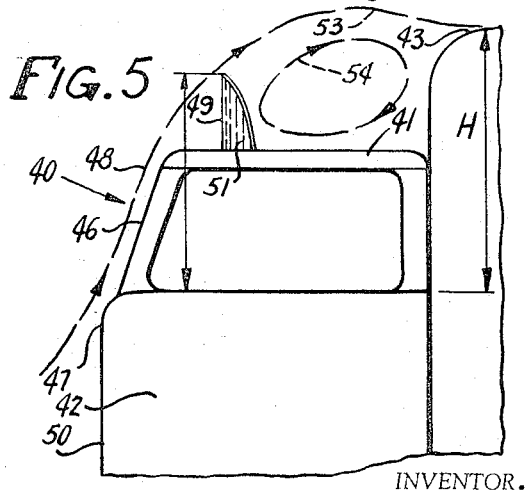
INVENTOR.
W. SELDEN SAUNDERS
BY Kimmel, Crowell & Weaver
ATTORNEYS.

United States Patent Office 3,309,131
Patented Mar. 14, 1967

3,309,131
MEANS FOR REDUCING LINEAR WIND RESISTANCE IN SINGLE CHASSIS TYPE VEHICLES
Walter Selden Saunders, 24 S. Chester Road, West Chester, Pa. 19380
Filed Feb. 11, 1966, Ser. No. 526,799
11 Claims. (Cl. 296—1)

This invention relates to a means for reducing linear wind resistance in vehicles, and more particularly in vehicles of the single chassis type, wherein there is provided a hood, a cab, and a body of greater height than the cab, or a cab-over-engine type vehicle having a body of greater effective height than the cab, and constitutes a continuation-in-part of my co-pending application, Ser. No. 341,622, filed Jan. 31, 1964, entitled, Apparatus for Reducing Linear and Lateral Wind Resistance in a Tractor-Trailer Combination Vehicle, the latter in turn being a continuation-in-part of my now abandoned application, Ser. No. 215,424, filed Aug. 7, 1962, entitled, Device To Reduce the Air Resistance of Trucks.

A primary object of this invention is the provision of means associated with the cab of a single chassis vehicle of the type mentioned above, wherein there is little or no gap provided between the rear of the cab and the front of the body, which will effectively reduce the wind resistance to forward movement of the vehicle.

A further object of the invention is the provision of such a device comprising a baffle located at a predetermined distance in advance of the body on the top of the cab which will effectively divert the flow of air in such manner as to reduce the direct impact against the enlarged rearward body, and consequently reduce the overall effective wind resistance of the vehicle.

A further object of this invention is the provision of a device of this nature which operates in a manner different from that of previous devices of similar nature, with the exception of that set forth in my above-mentioned co-pending application, in that rather than streamlining the body or the cab of the vehicle to afford a smooth and uniform air flow, which creates a difficult manufacturing problem, as well as reducing the body capacity of the vehicle, in most instances, the device of the instant invention produces a relatively wide diffusion of the airstream impacting a forward portion of the vehicle body, and causes the same to re-adhere to the sides and top of the body rearwardly of the front portion thereof in a relatively smooth and even manner, while at the same time creating a low pressure area or bubble behind the deflecting baffle on the cab roof, so that the body is in effect pushing forward against reduced rather than increased resistance.

As conducive to a clearer understanding of this invention, it may here be pointed out that applicant is aware that various methods, dissimilar to that disclosed in the above-mentioned co-pending application have heretofore been proposed for reducing the drag and the wind resistsance of single chassis vehicles. These methods have in the main followed conventional streamlining techniques in blending the cab, hood and appurtenances with the body, and have required a uniformly expensive manufacturing technique, and, in most instances, reduction in the effective body capacity. A streamlined body is generally considered to be one in which the flow experiences minimum separation from the surface of the body. The instant invention contemplates, in contrast to this, the employment of a deflecting device on the forward portion of the vehicle which deflects the oncoming air in such manner to occasion a wide separation of the airflow. This deflection is made to occur in such fashion that the flow moves in a convex path over the top of the cab, and reattaches to the forward portion of the body spaced rearwardly of the forward edge thereof, thus causing a large low pressure air bubble or vortex to be formed in the gap behind the baffle on the cab roof in front of the body. Thus, though a large separated region exists, the flow pattern set up results in a very material drag reduction due to the lowered resistance encountered by the forward portion of the body. As expected, such a deflector added to the cab of the vehicle having a body of the same or lesser dimensions will increase the drag on the cab but the drag is significantly and unexpectedly reduced on the vehicle as a unit, when such a baffle is applied, dimensioned and spaced, as hereinafter explained, to the cab of the vehicle which has a relatively large body therebehind.

A very important object of this invention is, therefore, to provide a device which produces a material reduction in the drag of the single chassis vehicle in the manner described in my co-pending application, differing therefrom in that the air gap or vortex is created on the roof of the vehicle rather than in the gap between the tractor and the trailer.

Still another object of the invention resides in proper dimensioning, spacing and locating of a baffle constructed in accordance with the afore-mentioned technique.

Still other objects reside in the combinations of elements, arrangements of parts, and features of construction, all as will be more fully pointed out hereinafter and disclosed in the accompanying drawings, wherein:

FIGURE 1 is a top plan view of one form of single chassis vehicle having a hood, a cab, and a body of greater width and height immediately adjacent the rear of the cab, showing one form of upright inclined baffle in accordance with the instant invention mounted thereon.

FIGURE 2 is a view similar to FIGURE 1, but showing a modified form of baffle.

FIGURE 3 is a fragmentary side elevational view of the baffle and its associated components shown in FIGURE 2.

FIGURE 4 is a front elevational view of the components of FIGURES 2 and 3.

FIGURE 5 is a side elevational view of a vertical baffle of FIGURE 2 shown as mounted on a van-type truck wherein the cab is positioned over the engine, but positioned rearwardly of the rounded front edge thereof, and FIGURE 6 is a top plan view of the structure of FIGURE 5.

Similar reference characters refer to similar parts throughout the several views of the drawing.

Referring now to the drawings in detail and more particularly to FIGURE 1, there is generally indicated at 10 a vehicle, of the single chassis type wherein the hood 11, the cab 12 and the body 13 are mounted on a single chassis, which may be of the double or multiple axle type as desired, and wherein there is no appreciable space between the rear of the cab and the front of the body as at 14. In some models of vehicles a slight space is left in this position, usually no greater than an inch or two and so slight as to make no material difference in the carrying out of the instant inventive concept. In FIGURE 1 the device of the instant invention is shown as a baffle or plate 15, which extends across the central portion of the front 16 with the roof 17 of the cab, in which is complemented at its extremities by triangular pieces 18 which are inclined rearwardly toward the edges of the roof. The central portion of the baffle deflects air upwardly over the top of body 14, while the inclined side pieces deflect air outwardly as will be described more fully hereinafter. A similar arrangement is shown in FIGURE 2 wherein a similar vehicle 20 is disclosed having a hood 21, a cab 22 and a body 23, a baffle having a central portion 24 being positioned closely adjacent the forward edge of the body, and having arcuate forwardly convex side portions 25 extending to the opposite sides of the cab roof. Here, as in the previously described modification, there is little or no space between the front of the body and the rear of the cab, as indicated at 26. As will be seen by the position of the dotted line arrows, air impacting the windshield 27 of the cab is directed upwardly past the front face 24 of the baffle, and deflected laterally around the sides. The height and positioning of the baffle is such, as will be explained hereinafter, that the air is relatively widely deflected beyond the sides of the vehicle as shown in 30 by the dotted line arrows, and above the top of the vehicle as shown by the dotted line arrows 31 in FIGURE 3. The diverted air 30 reattaches smoothly to the sides of the body as at 32, while the deflected air 31 reattaches smoothly and flowingly to the top of the body as at 33. In the space between the baffle 24 and the forward end of body 23 a low pressure area or air eddy is created as indicated by dotted lines 35. It is against this low pressure area created by the wide deflection of the air from the front and sides of the baffle that the forward portion of the body 23 above the cab roof 22 advances, thus materially reducing the air pressure against which the entire assemblage moves. It has been found by a process of trial and error, and by theoretical experiment that the baffle should be positioned closely adjacent to the windshield, so as to present, in effect, an extension thereof, and wherein the total height from the top of the hood to the top of the combined windshield and baffle may be designated as $h$, the height of the baffle is so calculated that $h=0.7H$ where H is the height of the body from the top of the hood to the body top.

The theory underlying the derivation of the above formula is fully set forth in the above-mentioned co-pending application, wherein the relationship of a disc positioned in advance of a cylinder in an airstream and the relative size and spacing of the disc is discussed in detail. In the present instance, the distance $x$ between the baffle and the front of the body may vary, it being preferable to substantially align the baffle with the windshield or as close as structurally expedient, to placing the same at an exact distance, since in this instance the creation of a low pressure eddy on the top of the vehicle is less a factor of the distance $x$ than of the relative height $h$ to H. Similarly, in the previously mentioned co-pending application, the width of the shield has been computed and where $w$ equals the half-width of the shield and W equals the half-width of the body; then $w/W$ preferably equals 0.7. In practice, it has been found that such variations in height between 0.6 and 0.8 are permissible. Because of quarterly winds the preferred width of the baffle most effective in reducing drag, in accordance with the theory above-mentioned, has been found to be between 0.8 and 0.9, or $w/W=0.8$ to 0.9.

It has been found preferable in practice, although not essential, to round the ends of the shield or baffle with a radius of about one-third $h$, this radius most effectively facilitating the deployment of the air in the convex pattern 30, disclosed in FIGURE 2.

FIGURES 5 and 6 disclose a modified form of the inventive concept wherein the same inventive theory is employed. In this form of the invention there is generally indicated at 40 a van-type truck wherein the cab 41 is positioned over the engine compartment 42, with the body 43 being closely juxtaposed to the rear of the cab and engine compartment. The windshield 46 here extends vertically in substantially perpendicular relation and is positioned slightly rearwardly of the substantially vertical front 47 of the engine compartment for structural reasons, toward the downwardly rounded front edge of the vehicle, the engine compartment also contains the radiator and a forward entrance for air thereto. Accordingly, air impacting front of such a vehicle is divided at substantially the point A at the bottom of the windshield, and a portion 48 thereof directed upwardly past the front of the windshield and over the baffle 49. An additional portion is directed downwardly as indicated by the arrows 50 into the radiator and below the truck body. The ends of baffle 49 are rounded as at 51 as in the previously described modification, and the deflection of air is convexly outwardly as indicated in FIGURE 6 at 52, and upwardly as indicated in FIGURE 5 at 53. A substantially stable eddy 54 is thus created between the baffle and the front of the truck body 43, as in the preceding modification, and the ratios relative to height, distance and width are the same as those in the previously described modification, the distances being taken from a horizontal line through the point A, or the point at which the air impacting the front of the vehicle divides.

A vertical baffle positioned as shown in FIGURE 5 gives substantially the same reduction as the arcuate or inclined baffles of the previous modifications. It is to be understood that the baffles of FIGURES 1 and 2 may be used interchangeably with the vehicle of FIGURE 5 and vice versa. Similarly, the baffle of FIGURE 5, while shown as perpendicular, may also be inclined as a substantial extension of the incline of the windshield, or may be inclined at a materially greater or less angle, and that the ends may be arcuate, squared, angled, or perfectly plain, without violating either the theory of the invention, or the primary concept thereof, this being the deflection of the air upwardly from a relatively low cab top over a relatively high body top, in a convex path, so that the airstream attaches linearly to the top of the vehicle after passing over the forward portion of the body, thus creating an eddy of substantially stable, substantially low pressure air between the baffle and the front of the body, the ratio for achieving optimum results being, as above stated, $h=0.7H$.

From the foregoing it will now be seen that there is herein provided a means for reducing linear wind resistance in single chassis type vehicles, corresponding to and operating under the same theory as that disclosed in my above-mentioned co-pending application applied to tractor-trailer combinations, which accomplishes all of the objects of this invention, and others, including many advantages of great practical utility and commercial importance.

As many embodiments may be made of this inventive concept, and as many modifications may be made of the embodiments hereinbefore shown and described, it is to be understood that all matter here is to be interpreted merely as illustrative and not in a limiting sense.

I claim:

1. A means for reducing linear wind resistance in combination with a single chassis vehicle including a cab having a windshield, an engine compartment having its top terminating below said windshield and a body having a height in excess of the height of said cab and having its front edge closely juxtaposed to the rear of said cab leaving no appreciable air gap therebetween, said means comprising an upstanding baffle mounted adjacent the forward edge of the cab at the top of the windshield so dimensioned as to deflect the airstream impacting the windshield and baffle over the top of said front edge of the body, the airstream reattaching to the top of the body at a point rearwardly of said forward edge in a smooth linear flow defining a low pressure air eddy on the cab roof between said baffle and said front edge of said body, the height of the windshield plus the height of the baffle being equal to between 0.6 and 0.8 of the height of said body above said engine compartment.

2. The structure of claim 1 wherein said baffle extends transversely of the cab.

3. The structure of claim 1 wherein said baffle is inclined rearwardly vertically.

4. The structure of claim 1 wherein the ends of said baffle are inclined rearwardly relative to the transverse plane of the baffle.

5. The structure of claim 4 wherein said inclined ends are arcuate and forwardly convexed.

6. The structure of claim 1 wherein, when $h$ equals the combined height of said windshield and said upstanding baffle and H equals the height of said body above a line extending along an extension of the line of division of air between the windshield and the said engine compartment, $h$ equals 0.7H.

7. The structure of claim 1 wherein the half width of said baffle is substantially equal to 0.7 of the half-width of the body.

8. The structure of claim 1 wherein the distance of said baffle from the front of said body is substantially equal to 0.7 of the half-width of the body.

9. The structure of claim 6 wherein the half-width of said baffle is substantially equal to 0.7 of the half-width of the body.

10. The structure of claim 6 wherein the distance of said baffle from the front of said body is substantially equal to 0.7 of the half-width of the body.

11. The structure of claim 9 wherein the distance of said baffle from the front of said body is substantially equal to 0.7 of the half-width of the body.

References Cited by the Examiner

UNITED STATES PATENTS 2,863,695  12/1958  Stamm _____ 296—1

FOREIGN PATENTS 1,022,481  1/1958  Germany.
734,735  8/1955  Great Britain.

BENJAMIN HERSH, *Primary Examiner.*

P. GOODMAN, *Assistant Examiner.*

Disclaimer 3,309,131.—*Walter Selden Saunders*, West Chester, Pa. MEANS FOR REDUCING LINEAR WIND RESISTANCE IN SINGLE CHASSIS TYPE VEHICLES. Patent dated Mar. 14, 1967. Disclaimer filed Mar. 16, 1977, by the inventor.

The term of this patent subsequent to Mar. 22, 1983, has been disclaimed.

[*Official Gazette January 26, 1982.*]